United States Patent [19]
McCafferty

[11] Patent Number: 4,886,419
[45] Date of Patent: Dec. 12, 1989

[54] ELASTOMERIC BEARING FOR HELICOPTER ROTOR HAVING LEAD-LAG DAMPING

[75] Inventor: Hugh A. McCafferty, Upper Darby, Pa.

[73] Assignee: The Boeing Company, Seattle, Wash.

[21] Appl. No.: 252,795

[22] Filed: Sep. 30, 1988

[51] Int. Cl.4 ............................................ B64C 27/38
[52] U.S. Cl. ............................... 416/134 A; 416/140; 416/141
[58] Field of Search .......... 416/134 A, 134 R, 140 A, 416/141 R, 170 B, 244 D, 230 A

[56] References Cited

U.S. PATENT DOCUMENTS

| 3,083,065 | 3/1963 | Hinks et al. | 416/141 R X |
| 3,106,965 | 10/1963 | Gorndt et al. | |
| 3,111,172 | 11/1963 | Gorndt et al. | 416/141 R X |
| 3,228,673 | 1/1966 | Hinks | 416/134 A X |
| 3,390,899 | 7/1968 | Herbert et al. | 416/141 X |
| 3,761,199 | 9/1973 | Ferris et al. | 416/134 A |
| 4,105,266 | 8/1978 | Finney | 416/134 A X |
| 4,227,858 | 10/1980 | Donguy | 416/144 X |
| 4,257,739 | 3/1981 | Covington et al. | 416/134 A |
| 4,369,019 | 1/1983 | Lovera et al. | 416/134 |
| 4,588,356 | 5/1986 | Pariani | 416/140 |
| 4,690,615 | 9/1987 | Kuntze-Fechner | 416/134 |
| 4,732,540 | 3/1988 | Mouille | 416/140 |
| 4,737,075 | 4/1988 | Leman | 416/140 |
| 4,749,339 | 6/1988 | Mouille et al. | 416/140 |

Primary Examiner—Everette A. Powell, Jr.
Attorney, Agent, or Firm—Jones, Tuller & Cooper

[57] ABSTRACT

A spherical bearing for a helicopter rotor connects a rotor blade to a rotor hub. The bearing includes an outer race supported on the hub and an inner race spaced axially from the outer race supported by a shackle attached to the blade root. Each race defines a concentric spherical surface. Multiple laminates of elastomer and shims of metal are arranged alternately between the races. The laminates and shims are bonded to each other to form an assembly that is bonded to the races at radially opposite ends. Each laminate has an opening formed at its center extending through its thickness. A coupon of elastomer, whose damping characteristics exceed those of the laminates, is fitted within each opening with suitable dimensions to minimize control loads and flapwise damping, yet the coupon increases lead-lag damping.

13 Claims, 3 Drawing Sheets

ELASTOMERIC BEARING FOR HELICOPTER ROTOR HAVING LEAD-LAG DAMPING

BACKGROUND OF THE INVENTION

1. Field of the Invention

This invention relates to a connection on the rotor of a helicopter where rotor blades are joined to a hub for articulated movement. More particularily the invention pertains to a bearing located at the connection that permits universal rotation of blades with respect to the hub and integrally damps rotational movement about intersecting axes.

2. Description of the Prior Art

U.S. Pat. No. 3,106,965 describes a helicopter rotor having a universal bearing comprising spherical, axially spaced concentric members having a body of alternating laminates of elastomer and metal bonded to the members. Centrifugal force carried along the rotor blades is transmitted through the bearing by compressing the body of laimates. Motion of the blade about perpendicular axes intersecting at the bearing center is limited by elastomeric stops that prevent lead-lag and flapping movement of the rotor due to contact with the stops. Damping is contolled by varying the elastomer from which the stops are fabricated.

U.S. Pat. No. 4,588,356 describes use of multiple elastomeric bearings in a rotor head. One of the bearings, located between a fork element and hub, damps blade oscillation in the verticle and horizontal planes. Damping capacity of the bearing is adjustable by varying radii of curvature of faces whose centers coincide with a virtual hinge, about which the blades oscillate in the hub plane.

U.S. Pat. No. 4,732,540 describes a technique for restraining non-rotational flapwise movement of a helicopter rotor blade mounted on a rotor that employs a spherical bearing comprising a stack of metal and synthetic rubber laminates retained between rigid frames. In-plane damping results from operation of a drag damper operating between an attachment on the blade, located outboard of the bearing, and a clevis attachment on the rotor hub. The damper is a cylindrical sleeve of visco-elastic material joined by ball and socket connections to blade and hub.

The drag dampers described in U.S. Pat. No. 4,749,339 are conventional hydraulic devices, an alternating stack of rigid plates and plates, or coaxial tubes having a cylindrical sleeve of visco-elastic material located between the tubes.

SUMMARY OF THE INVENTION

In-plane or lead-lag damping is required to avoid ground resonance, which if uncontrolled can cause substantial damage to the aircraft. Flapwise motion imposes less need for corresponding flap damping by external devices than is provided inherently by structural and aerodynamic effects. Rotor pitch motion occurs at low frequency relative to flapwise and in-plane motion; therefore, pitch damping requirements are easily realized by aerodymanic and structural damping. It is preferable to avoid the expense, cost, weight and complexity of conventional hydraulic lead-lag dampers, yet need for devices dedicated to damping lead-lag displacement of the blades relative to the hub is well established.

This invention incorporates the lead-lag damping function into a spherical coincident hinge elastomeric bearing in a helicopter tail rotor or fan. The laminates of the bearing inherently have both elastic and damping characteristics, i.e., the laminates dissipate a portion of the dynamic energy resulting from lead-lag motion and store a portion of this dynamic energy by compressing the laminates for release upon later relief of the forces causing compression. Elastomer and other visco-elastic materials suitable for the laminates of the bearing have both damping and elastic properties or characteristics to varying degrees. Materials having these properties are selected to suit specific rotor requirements for damping, strength, stiffness and durability.

Here, in a rotor attachment that includes a bearing according to this invention, visco-elastic material having large damping capability relative to that of the bearing laminates is selected for laminate coupons, located within the bearing, and shaped to maximize damping associated with rotor blade motion about a particular axis and to minimize is damping effect about other axes.

The helicopter attachment according to this invention includes a joint for connecting a rotor hub adapted for driveable connection to a power source and rotor blades extending radially along an axis directed outward from the hub. A shackle fixed to the blade near the blade root radially outboard of the hub, extends above and below the hub. A first bearing race fixed to the shackle has a spherical surface facing the blade centered on the axis. A second bearing race fixed to the hub, has a spherical surface facing the surface of the first bearing race.

Shims of metal spaced from one another along the axis and laminates of visco-elastic material are interposed between the first and second bearing races and bonded to adjacent shims, laminates and races. Coupons of material having higher damping characteristics than that of the laminates and shims is located in openings formed in the laminates, substantially filling each opening, and bonded to adjacent shims and races. The shims, coupons, and bearing races are formed with substantially aligned holes forming a passage extending through the radial length of the bearing. Resistance of the coupon to lead-lag motion between the bearing races is greater than its resistance to flapwise motion.

DESCRIPTION OF THE PREFERRED EMBODIMENT

Figure 1:
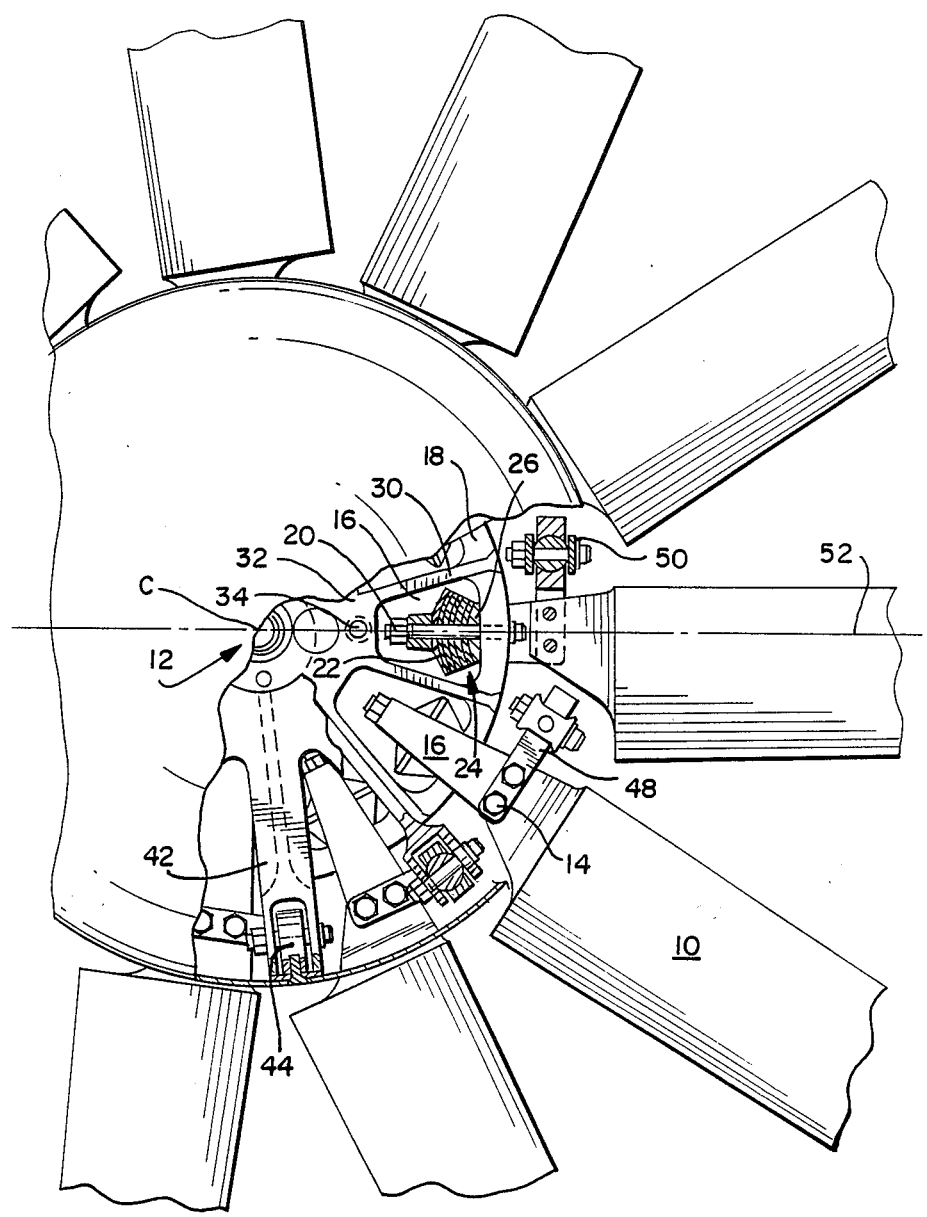
FIG. 1 is an elevation view of a helicopter tail rotor showing a rotor blade at various angular positions, a rotor hub, upper control components, and an elastomeric bearing.
Figure 2:
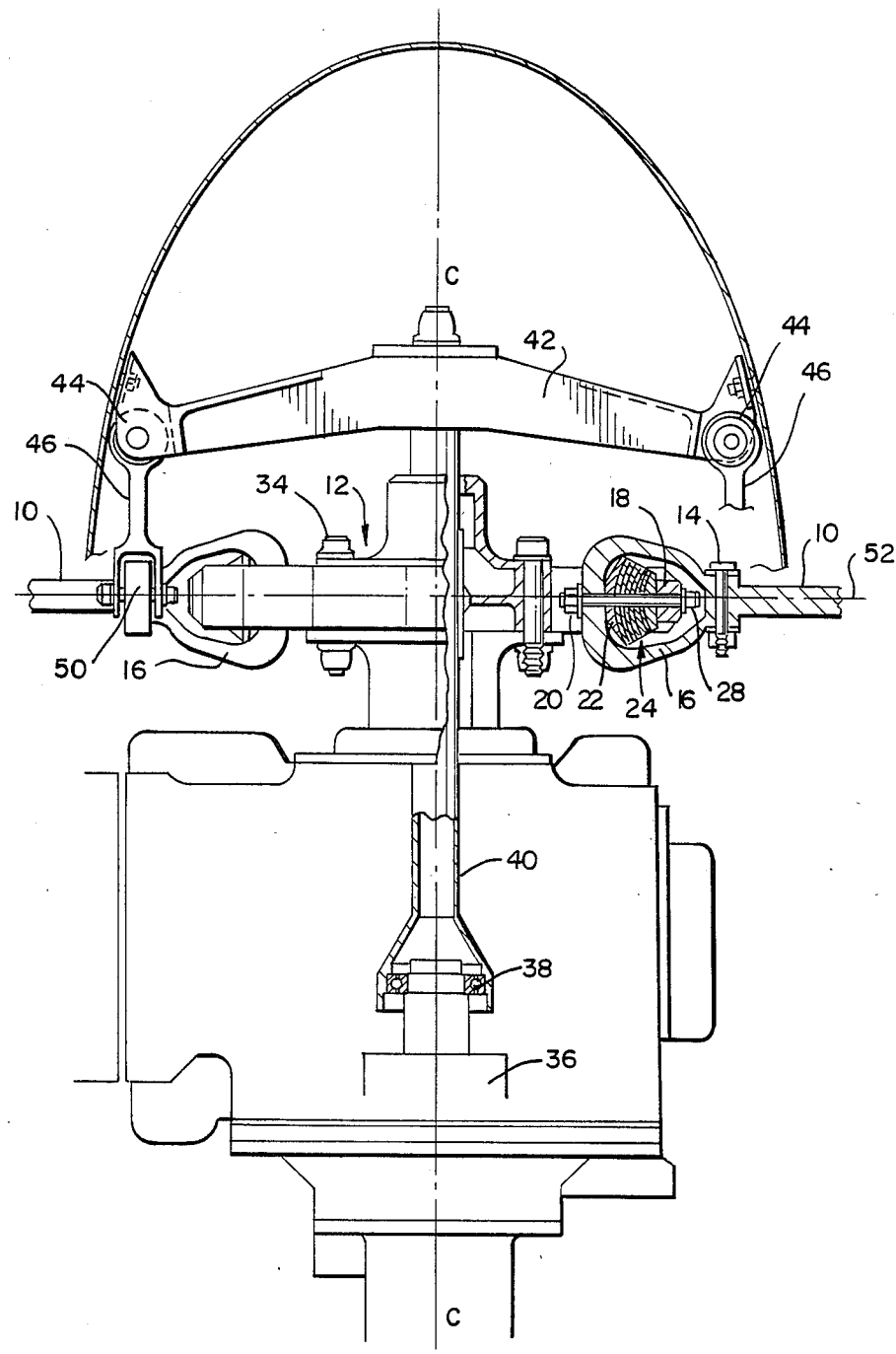
FIG. 2 is a plan view of the tail rotor of FIG. 1.
Figure 3:
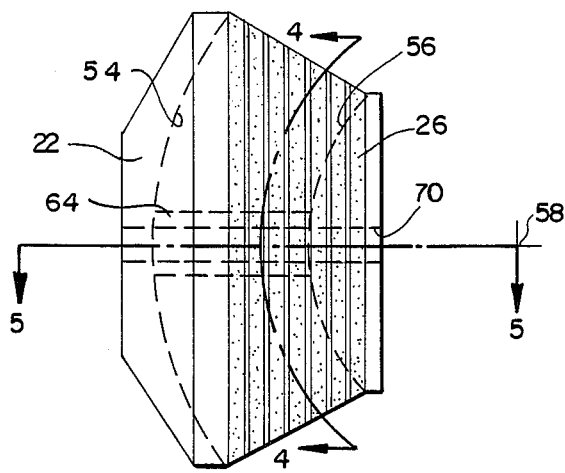
FIG. 3 is a top view of a spherical elastomeric bearing according to this invention.

The helicopter rotor shown in FIGS. 1 and 2 includes rotor blades 10 mounted on a rotor hub for rotation in a plane that is substantially vertical. Laterally directed thrust load developed by the blades and transferred to the hub and airframe of the helicopter stabilizes the aircraft and reacts torsion applied to the main rotor that would otherwise tend to rotate the aircraft. These lateral loads are also used for directional control, e.g., to turn the aircraft about the main rotor axis with little or no forward movement.

Power from a transmission driven by an engine turns the rotor and rotates the blades about axis C—C. Each blade is attached by a bolted connection 14, which reaches over and below a circular ring 18 located at the circumference of hub plate 12 to an attachment 20, where the radially inner spherical race 22 of an elastomeric bearing 24 is joined to the shackle. A radially outer race 26 of bearing 24 is bolted at 28 to ring 18 of the hub. Radial webs 30 extending from an inner ring 32 of the hub connect outer ring 18 to the inner ring. In this way, centrifugal force carried by the blade is transmitted by the shackle to bearing race 22, then to outer bearing race 26 by compression in the bearing, and finally from outer ring 18 along webs 30 to inner ring 32. Bolts 34 connect ring 32 to hub 12, which is driveably connected to the power source.

The angle of attack of the blades with respect to ambient air is controlled partially by a collective pitch signal produced by a directional control system subject to manual control of the helicopter pilot. Vertical movement of actuator 36 is converted to collective pitch in the rotor system by its transmission through bearing 38 to control shaft 40. A spider 42, mounted on the end of the rotor shaft, includes arms extending outward toward a universal joint 44, where a pitch link is connected to each spider arm. Each rotor blade includes a pitch horn 48 connected by bolts 14 to the root of the blade. Each pitch horn is connected to a pitch link at an attachment 50 laterally offset from the pitch axis 52, about which axis the pitch angle or angle of attack changes. Therefore, as actuator 36 moves vertically, that motion is transmitted through the spider and pitch links to change the pitch angle of each blade in proportion to vertical displacement of the actuator.

In addition to pitch movement about axis 42, each blade has flapping motion about an axis in the plane of FIG. 2 and lead-lag or drag motion in the plane of FIG. 1. These motions also are accomodated by bearing 24. If the blades were fixed about the flap bending axis at the blade root, steady and alternating flapwise moments at the blade root would rise to enormous levels, due to the presence of flapwise continuity there. But because the bearing permits substantially unrestrained rotation of the blade about the flap axis, flapwise moments in the vicinity of the blade root are considerably lower than they would be if the rotor were fixed to the hub. However, the flapwise motion introduces coriolis in-plane forces which can lead to an instability condition called ground resonance. Conventionally ground resonance is overcome or avoided by tuning, with use of lead-lag dampers, the in-plane frequency of the rotor to avoid harmonic frequencies where the ground resoance forcing function can cause uncontrollable, extremely large cyclic displacement. Flapwise motion imposes less need for corresponding flap damping by external means than the damping provided inherently by structural and aerodynamic effects. Because pitching motion occurs at low frequency relative to flapwise and in-plane motion, aerodynamic and structural damping are sufficient to provide the relatively low damping forces required.

Inner and outer races 22, 26 of bearing 24 are spaced axially along the blade and define spherical surfaces 54, 56 having a common center 58, or nearly coincident centers. Located between races 22 and 26 are elastomeric laminates 60 and thin metal shims 62 alternating with the elastomer laminates. The shims and laminates, which are formed with spherical radii, are bonded to one another. The assembly of laminates and shims so formed is bonded to spherical surfaces 54, 56 of the bearing races. An opening 62, shown rectangular in FIG. 4, is formed through the thickness of all, or a portion of, the laminates.

Coupons 64, made of elastomer or other visco-elastic material, natural or synthetic, having more advantageous damping properties than that of laminates 60, are formed with shape and size suitable to fit within openings 62. Each coupon has the same thickness as the thickness of the laminate material it replaces. Preferably the width 66 of each coupon, the dimension that intersects the plane in which flapping motion occurs, is smaller than its length 68, the dimension in the plane of the rotor. The contribution of the coupons to bending resistance of the bearing about the flap axis varies with its width. The contribution of the coupons to bending resistance of the bearing about the in-plane or lead-lag axis varies with its length. Therefore, lead-lag damping of the bearing is increased with use of coupons of material having high damping characteristics, without a large effect on flapwise damping by forming the coupons with their length greater than their width. Also the geometric center or centroid of each coupon is located on the pitch axis 52 in order to minimize any adverse effect on control loads resulting from an increase in pitch damping.

Figure 4:
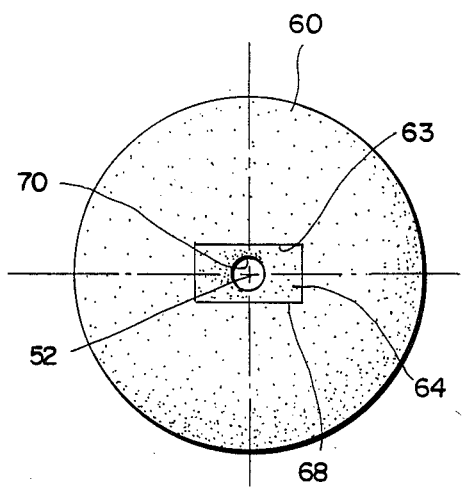
FIG. 4 is a cross section of the bearing of FIG. 3 taken at surface A—A.
Figure 5:
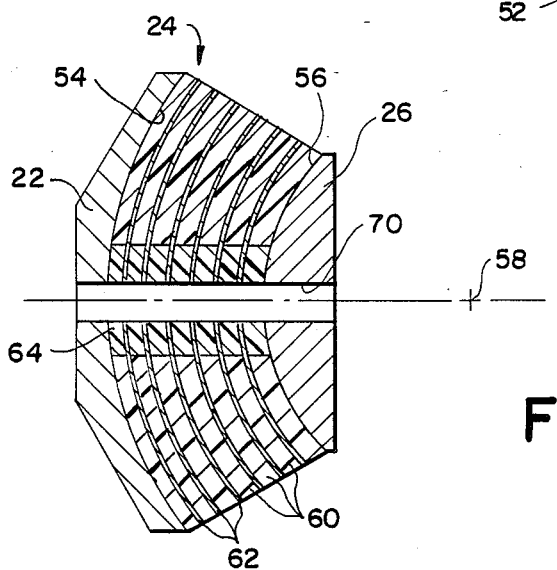
FIG. 5 is a cross section taken at plane B—B of FIG. 3.

Althought the coupon illustrated in FIG. 4 is rectangular, other suitable shapes can be used. For example, the coupon can be elliptical, centered on the pitch axis and arranged with its major axis parallel to the rotor plane and its minor axis perpendicular to the rotor plane.

A hole 70 extending through the bearing races, shims and coupons permits air to pass through the bearing due to the pumping action of centrifugal force. In this way dynamic energy dissipated by damping and converted to heat energy is carried from the bearing in order to avoid degrading the quality and resilience of the elastomer over time.

I claim:

1. In a helicopter rotor having a rotor hub adapted for driveable connection to a power source and rotor blades extending radially along an axis directed outward from the hub, a joint between a rotor blade and hub comprising:

a first bearing race fixed to the blade having a surface facing the blade and centered substantially on the axis;

a second bearing race fixed to the hub, having a surface facing the surface of the first bearing race and spaced radially outward along the axis from the first bearing race;

shims of relatively rigid material spaced from one another along the axis and located between the first and second bearing races;

laminates of material from the group consisting of natural and synthetic elastomer, silicon elastomer and visco-elastic material, interposed between each shim and the first and second bearing races, bonded to said shims and races, each laminate having an opening through its thickness;

coupons of material having relatively higher damping characteristics than that of the laminates and shims, located in the openings of the laminates, substantially filling each opening, and bonded to adjacent shims and races.

2. The attachment of claim 1 wherein the surface of the first bearing race is a portion of a sphere, the surface of the second bearing race is a portion of a sphere and a complement of the surface of the first bearing race, the centers of said surfaces being substantially coincident and located on said axis, and the laminates, shims and coupons have complementary spherical surfaces.

3. The attachment of claim 1 wherein the shims, coupons, and first and second bearing races are formed with substantially aligned holes forming a passage extending through the radial length of the bearing.

4. The attachment of claim 1 wherein the resistance of the coupon to lead-lag motion between the first and second bearing races is greater than its resistance to flapwise motion between the first and second bearing races.

5. The attachment of claim 2 wherein the shims, coupons, and first and second bearing races are formed with substantially aligned holes forming a passage extending through the radial length of the bearing.

6. The attachment of claim 2 wherein the resistance of the coupon to lead-lag motion between the first and second bearing races is greater than its resistance to flapwise motion between the first and second bearing races.

7. A bearing for joining a helicopter rotor blade and hub comprising:
- a first bearing race fixed to the blade having a surface facing the blade and centered substantially on the pich axis;
- a second bearing race fixed to the hub, having a surface facing the surface of the first bearing race and spaced radially outward along the axis from the first bearing race;
- shims of relatively rigid material spaced from one another along the axis and located between the first and second bearing races;
- laminates of material from the group consisting of natural and synthetic elastomer, silicon elastomer and visco-elastic material, interposed between each shim and the first and second bearing races, bonded to said shims and races, each laminate having an opening through its thickness;
- coupons of material having relatively higher damping characteristics than that of the laminates and shims, located in the openings of the laminates, substantially filling each opening, and bonded to adjacent shims and races.

8. The attachment of claim 7 wherein the surface of the first bearing race is a portion of a sphere, the surface of the second bearing race is a portion of a sphere and a complement of the surface of the first bearing race, the centers of said surfaces being substantilly coincident and located on said axis, and the laminates, shims and coupons have complementary spherical surfaces.

9. The attachment of claim 7 wherein the shims, coupons, and first and second bearing races are formed with substantially aligned holes forming a passage extending through the radial length of the bearing.

10. The attachment of claim 7 wherein the resistance of the coupon to lead-lag motion between the first and second bearing races is greater than its resistance to flapwise motion between the first and second bearing races.

11. The attachment of claim 8 wherein the shims, coupons, and first and second bearing races are formed with substantially aligned holes forming a passage extending through the radial length of the bearing.

12. The attachment of claim 8 wherein the resistance of the coupon to lead-lag between the first and second bearing races is greater than its resistance to flapwise between the first and second bearing races.

13. In a helicopter rotor having a rotor hub adapted for driveable connection to a power source and defining a hub ring, rotor blades extending radially along an axis directed outward from the hub, and a shackle fixed to the blade reaching over and below the hub ring inward from the blade toward the hub, a joint between a rotor blade and hub comprising:
- a first bearing race fixed to the shackle having a surface facing the blade and centered substantially on the axis, the surface of the first bearing race being a portion of a sphere;
- a second bearing race fixed to the hub, having a surface facing the surface of the first bearing race and spaced radially outward along the axis from the first bearing race, the surface of the second bearing race being a portion of a sphere and a complement of the surface of the first bearing race, the centers of said surfaces being substantially coincident and located on said axis,;
- shims of relatively rigid material spaced from one another along the axis and located between the first and second bearing races;
- laminates of material from the group consisting of natural and synthetic elastomer, silicon elastomer and visco-elastic material, interposed between each shim and the first and second bearing races, bonded to said shims and races, each laminate having an opening through its thickness;
- coupons of material having relatively higher damping characteristics than that of the laminates and shims, located in the openings of the laminates, substantially filling each opening, and bonded to adjacent shims and races, the laminates, shims and coupons having complementary spherical surfaces, the shims, coupons, and first and second bearing races being formed with substantially aligned holes forming a passage extending through the radial length of the bearing, the resistance of the coupon to lead-lag motion between the first and second bearing races being greater than its resistance to flapwise motion between the first and second bearing races.

* * * * *